US009065337B2

(12) United States Patent
Tanabe et al.

(10) Patent No.: US 9,065,337 B2
(45) Date of Patent: Jun. 23, 2015

(54) INDUCTOR CURRENT EMULATION CIRCUIT FOR A SWITCHING CONVERTER

(71) Applicant: Analog Devices Technology, Hamilton (BM)

(72) Inventors: Hirohisa Tanabe, Yokohama (JP); Kenji Tomiyoshi, Chiba (JP)

(73) Assignee: Analog Devices Global (BM)

( * ) Notice: Subject to any disclaimer, the term of this patent is extended or adjusted under 35 U.S.C. 154(b) by 248 days.

(21) Appl. No.: 13/775,820

(22) Filed: Feb. 25, 2013

(65) Prior Publication Data

US 2014/0239925 A1 Aug. 28, 2014

(51) Int. Cl.
*H02M 3/156* (2006.01)
*H02M 3/158* (2006.01)
*H02M 1/00* (2007.01)

(52) U.S. Cl.
CPC ............ *H02M 3/1582* (2013.01); *H02M 3/156* (2013.01); *H02M 2001/0009* (2013.01)

(58) Field of Classification Search
CPC ...................... H02M 2001/0009; H02M 3/156
See application file for complete search history.

(56) References Cited

U.S. PATENT DOCUMENTS

| | | | | |
|---|---|---|---|---|
| 6,377,032 | B1 * | 4/2002 | Andruzzi et al. | 323/224 |
| 7,298,122 | B2 | 11/2007 | Bernacchia et al. | |
| 2001/0046145 | A1 | 11/2001 | Oknaian et al. | |
| 2005/0280404 | A1 | 12/2005 | Lefevre | |
| 2008/0068866 | A1 | 3/2008 | Blanken | |
| 2010/0027298 | A1 * | 2/2010 | Cohen | 363/21.14 |
| 2012/0019226 | A1 * | 1/2012 | Wiktor | 323/285 |

FOREIGN PATENT DOCUMENTS

| | | | |
|---|---|---|---|
| DE | 602004006623 | T2 | 1/2008 |
| EP | 2515426 | A1 | 10/2012 |

OTHER PUBLICATIONS

"German Application Serial No. 10201402447.8, Office Action mailed Nov. 12, 2014", (w/ English Translation), 12 pgs.

* cited by examiner

*Primary Examiner* — Harry Behm
(74) *Attorney, Agent, or Firm* — Schwegman Lundberg & Woessner, P.A.

(57) ABSTRACT

An inductor current emulation circuit for use with a switching converter in which regulating the output voltage includes comparing an output which varies with the difference between the output voltage and a reference voltage with a 'ramp' signal which emulates the current in the output inductor. A current sensing circuit produces an output which varies with the current in the switching element that is turned on during the 'off' time, an emulated current generator circuit produces the 'ramp' signal during both 'off' and 'on' times, a comparator circuit compares the 'ramp' signal with at least one threshold voltage which varies with the sensed current and toggles an output when the 'ramp' exceeds the thresholds, and a feedback circuit produces an output which adjusts the 'ramp' signal each time the comparator circuit output toggles until the 'ramp' signal no longer exceeds the threshold voltages.

20 Claims, 7 Drawing Sheets

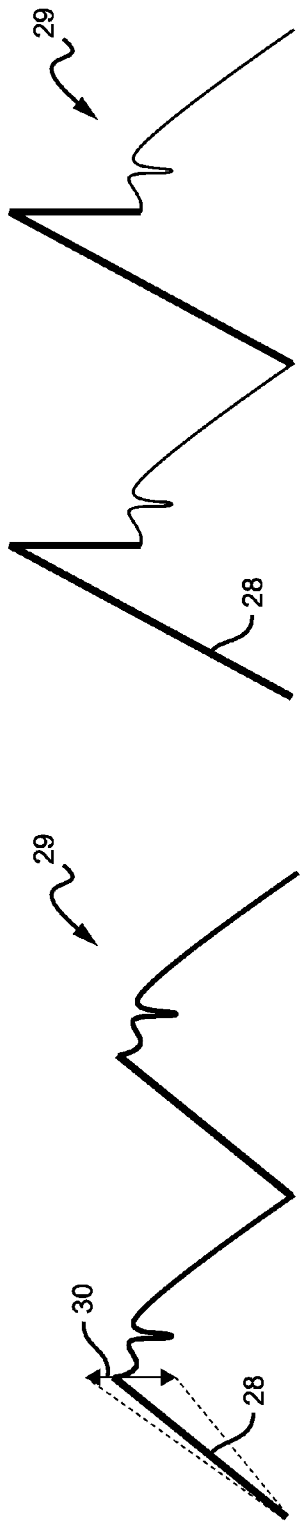
FIG. 2a
PRIOR ART
FIG. 2b
PRIOR ART
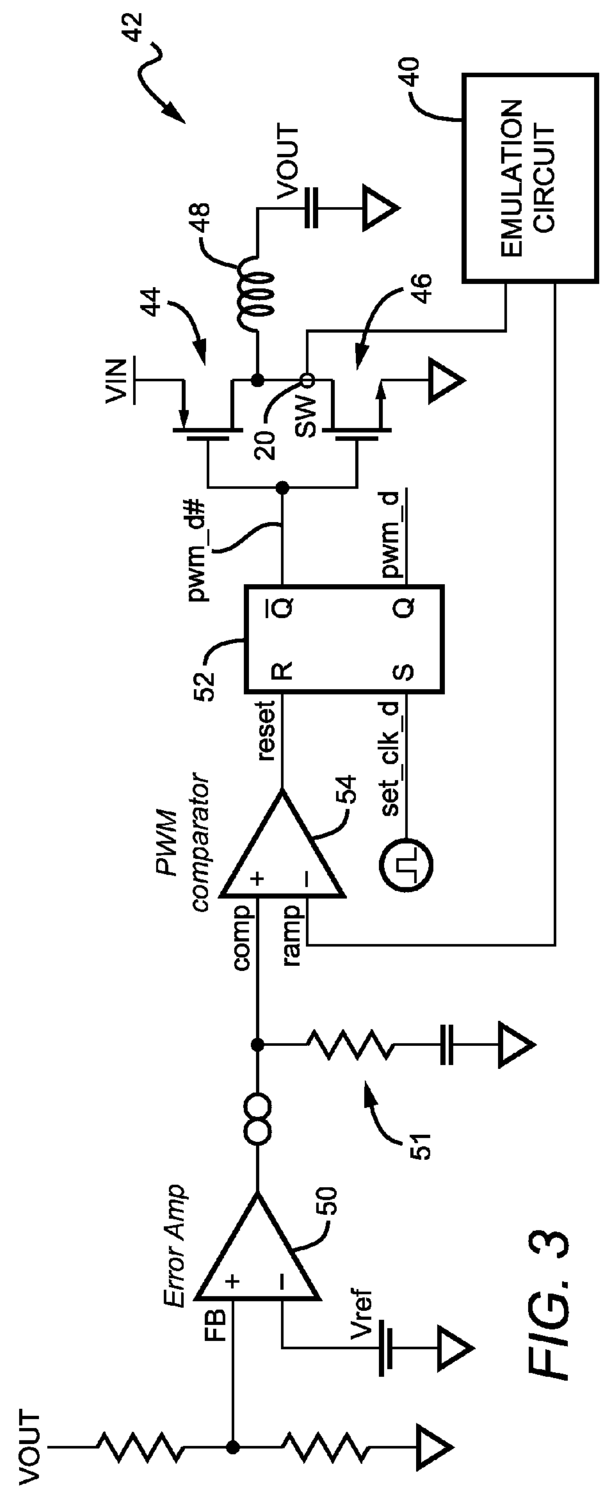
FIG. 3

40
Q
Counter
UP/DNB
68
70
106
104
set_clk_d
66
102
64
98
4 bits
92
94
96
Isns (From L_FET(buck)/H-FET)boost))
88
90
Vsns
86
60
Islp_cmp
84
dlyd_rst_d
100
62
82
pwm_d
ramp
C
81
76
74
72
Iin(∝ VIN)
pwm_d(buck)
On (boost)
78
80
On (buck)
pwm_d#(boost)
Iout(∝ VOUT)

40
Q
Counter
UP/DNB
68
70
106
104
set_clk_d
66
102
64
98
4 bits
Isns (From L-side FET)
92
94
96
88
90
86
Vsns
60
Islp_cmp
84
dlyd_rst_d
100
62
82
pwm_d
ramp
C
81
76
74
72
78
Iin(∝ VIN)
Iout(∝ VOUT)

40
Q
Counter
UP/DNB
68
70
106
104
set_clk_d
66
102
64
4 bits
92
94
96
Isns (From H-side FET)
88
90
Vsns
86
60
Islp_cmp
84
dlyd_rst_d
100
62
ramp
81
C
pwm_d
76
72
74
Iin(∝ VIN)
pwm_d#(boost)
80
Iout(∝ VOUT)

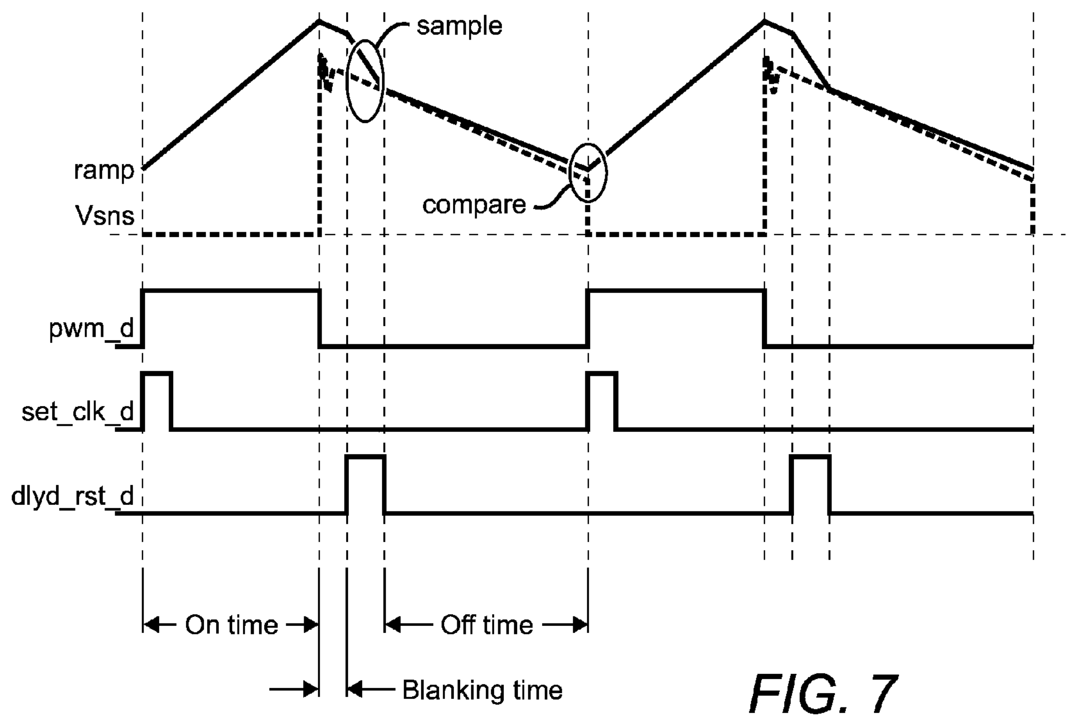
FIG. 7
FIG. 9
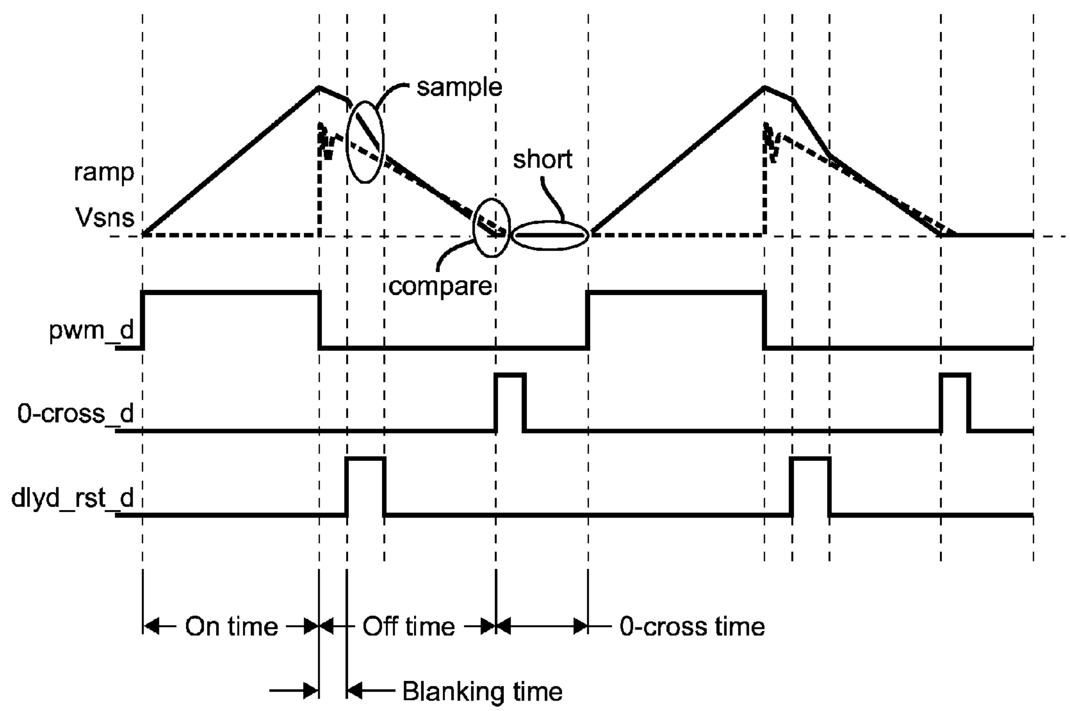

Pulse (beginning of 0 current)
0-cross_d
Counter
Q
UP/DNM
RC~10ns
4 bits
Isns
Vsns
Islp_cmp
dlyd_rst_d ON(0 current)
ramp
C
pwm_d
pwm_d(buck) On (boost) OFF(0 current)
On (buck) pwm_d#(boost) OFF(0 current)
Iin(∝ VIN)
Iout(∝ VOUT)
40
62
64
66
68
70
72
74
76
78
80
81
82
84
86
88
90
92
94
96
98
100
102
104
106

INDUCTOR CURRENT EMULATION CIRCUIT FOR A SWITCHING CONVERTER

BACKGROUND OF THE INVENTION

1. Field of the Invention

This invention relates generally to switching converters, and more particularly to switching converters which employ an emulated peak current mode control scheme.

2. Description of the Related Art

One control scheme for a switching power converter is known as emulated peak current mode; an example is shown in FIG. 1. The converter receives a supply voltage VIN and produces an output voltage VOUT; VOUT is divided by a voltage divider 10 to produce a feedback voltage FB. An error amplifier 12 receives FB and a reference voltage Vref at respective inputs and produces an output labeled 'comp'. In operation, high side and low side switching elements 14, 16 are driven with a signal pwm_d# produced by an SR latch 17, with pwm_d# going low and turning on switching element 14 each time the latch gets set with a clock signal 18. Signal 'comp' and a signal 'ramp' are compared with a PWM comparator 19, the output of which resets SR latch 17.

A current sensing circuit 20 senses the inductor current: if the converter is configured as a 'buck' converter, the current sensing circuit senses the current in low side switching element 16; if configured as a boost converter, the current in high side switching element 14 is sensed. The sensed current is used to provide the 'ramp' signal when the inductor current is negative—i.e., during the converter's 'off' time when the low side switching element is on. To emulate the positive inductor current, a current proportional to VIN−VOUT is connected to a capacitance 22; a slope compensation current $I_{slp\_cmp}$ may also be applied to capacitance 22 under some conditions. When the SR latch gets 'set', the signal on capacitance 22 is added to the sensed current (via a switch 24) and converted into a voltage (via a resistance 26) to form the 'ramp' signal. A diagram depicting typical 'comp' and 'ramp' signals is shown in FIG. 1.

For an emulated peak current mode control scheme, the current sense amp is connected to the synchronous switch (16 for the buck converter shown) instead of the main switch (14). Current sensing is done during the 'off' time, with an emulated slope that causes the 'ramp' signal to increase linearly with a rate that varies with VIN−VOUT generated during the 'on' time. This emulated slope is used at the 'off' to 'on' transition such that, even when the duty cycle is small, the slope is not affected by switching noise that might adversely affect other control schemes such as true peak current mode. This also avoids the need to provide a 'blanking time' at the 'off' to 'on' transition, as is common with a true peak current mode control scheme.

However, with an emulated peak current mode control scheme, the ratio of the emulated current slope and the slope of the actual sensed current can vary greatly, as the values of components external to the circuit are usually unknown, and the emulated slope may be changed by process or temperature variations. This is illustrated in FIG. 2*a*, in which the emulated positive slope 28 portion of 'ramp' signal 29 can vary over a range of values (30) as shown. If the emulated current slope is less than the actual sensed current slope, this may cause sub-harmonic oscillation. To prevent sub-harmonic oscillation, the emulated current slope is sometimes made much steeper than the actual sensed current slope; this is illustrated in FIG. 2*b*. However, in this case, system operation is closer to voltage mode than current mode, and the response tends to be slow.

SUMMARY OF THE INVENTION

An inductor current emulation circuit for a switching converter is presented which addresses the problems discussed above.

The present emulation circuit is for use with a switching converter arranged to operate high and low side switching elements connected to an output inductor using a switching cycle having an associated 'on' time and 'off' time to produce an output voltage, in which regulation of the output voltage includes comparing an output which varies with the difference between the output voltage and a reference voltage with a 'ramp' signal which emulates the current in the converter's output inductor. The emulation circuit comprises a current sensing circuit arranged to produce an output which varies with the current in the switching element that is turned on during the 'off' time, an emulated current generator circuit arranged to produce the 'ramp' signal such that it emulates the current in the output inductor during both 'off' and 'on' times and which varies the 'ramp' signal in response to a control signal, a comparator circuit arranged to, during the 'off' time, compare the 'ramp' signal with at least one threshold voltage which varies with the current sensing circuit output and to toggle an output when the 'ramp' signal exceeds the at least one threshold, and a feedback circuit which provides the control signal to the emulated current generator circuit and is arranged to vary the control signal each time the comparator circuit output toggles until the 'ramp' signal no longer exceeds the at least one threshold voltages. This serves to improve the accuracy of the 'ramp' signal during the 'on' time.

The emulated current generator circuit preferably comprises first and second current sources arranged to output positive (source) and negative (sink) currents, respectively, which vary with the feedback circuit output. At least one switch is connected between the output of at least one of the current sources and a first node, to which a capacitance is also connected. The emulation current generator circuit is arranged such that:

when the converter is configured as a buck converter, the second current source is connected to the first node during both 'on' and 'off' times, and the at least one switch connects the output of the first current source to the first node during the 'on' time; and when the converter is configured as a boost converter, the first current source is connected to the first node during both 'on' and 'off' times, and the at least one switch connects the output of the second current source to the first node during the 'off' time.

The signal at the first node is the 'ramp' signal.

The feedback circuit is suitably a counter, arranged such that its count is changed when the comparator circuit indicates that the 'ramp' signal exceeds high or low threshold voltages that vary with the current sensing circuit output. At least one of the first and second current sources is then preferably arranged to vary its output current based on the digital word represented by the counter output. By comparing the emulated slope with the actual current sensing circuit output and using the difference to adjust the emulated slope, the emulated slope during the 'on' time can be well-matched to the actual slope, providing performance comparable with conventional true peak current mode converters while retaining the benefits of emulated peak mode converters.

These and other features, aspects, and advantages of the present invention will become better understood with reference to the following description and claims.

BRIEF DESCRIPTION OF THE DRAWINGS

FIGS. 2*a* and 2*b* are diagrams of possible 'ramp' signals for an emulated peak current mode switching converter such as that shown in FIG. 1.

FIG. 3 is a schematic/block diagram of a switching converter which employs an inductor current emulation circuit per the present invention.

FIG. 7 is a timing diagram illustrating the operation of the present inductor current emulation circuit.

FIG. 9 is a timing diagram illustrating the operation of the present inductor current emulation circuit in response to a 0-cross condition.

DETAILED DESCRIPTION OF THE INVENTION

Figure 1:
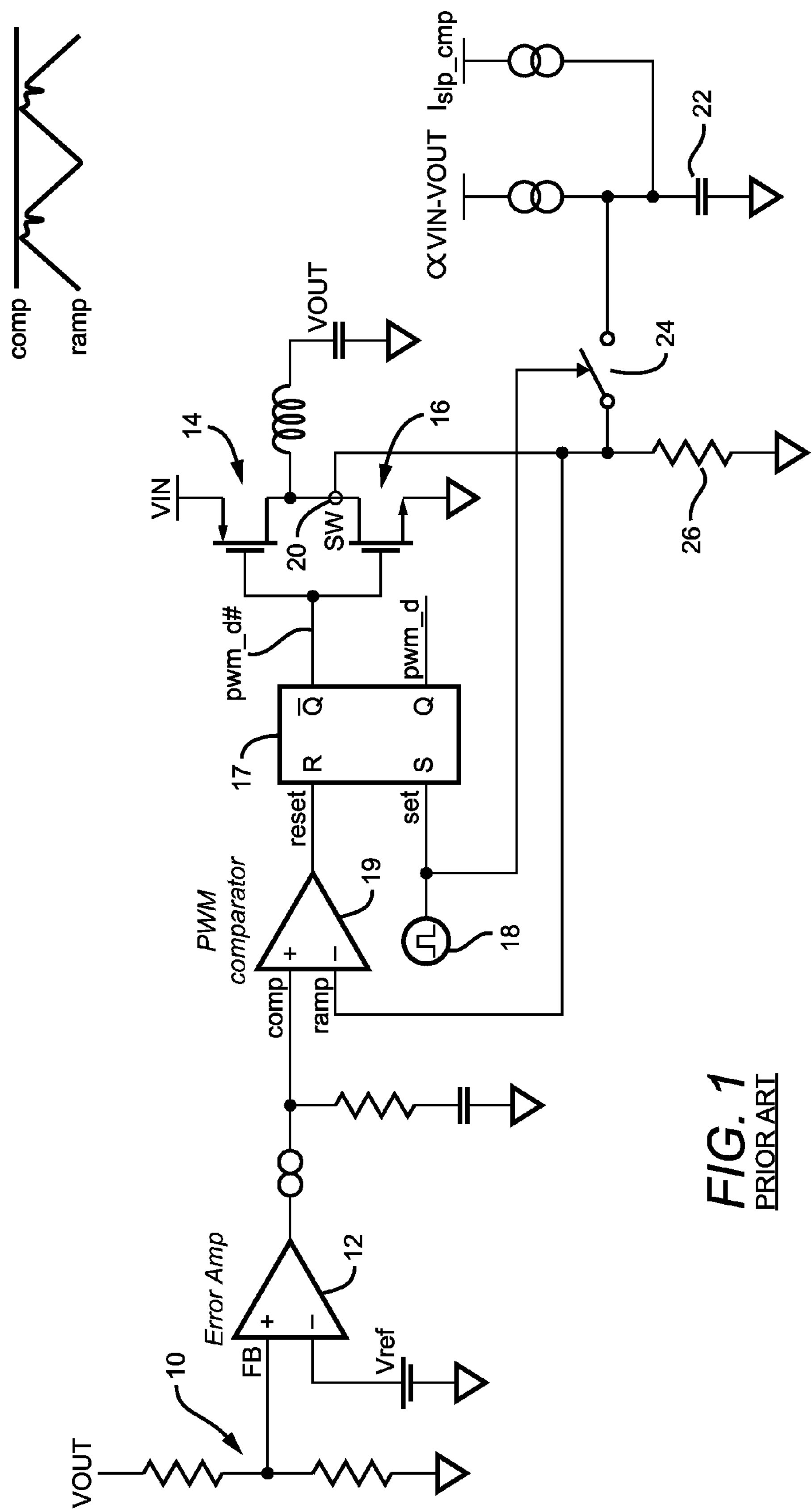
FIG. 1 is a schematic diagram of a known emulated peak current mode switching converter.

A switching converter which employs an inductor current emulation circuit per the present invention is shown in FIG. 3. The inductor current emulation circuit 40 is for use with a switching converter 42 which receives a supply voltage VIN and is arranged to operate high and low side switching elements 44, 46 (typically FETs) connected to an output inductor 48 using a switching cycle having an associated 'on' time and 'off' time to produce an output voltage VOUT, in which regulation of VOUT includes comparing an output ('comp') which varies with the difference between VOUT and a reference voltage Vref with a ramp signal ('ramp') which emulates the current in output inductor 48. As with the conventional emulated peak current mode architecture discussed above, VOUT is preferably divided by a voltage divider to produce a feedback voltage FB; an error amplifier 50 receives FB and Vref at respective inputs and produces the 'comp' output. For proper operation, compensation components represented by 51 would typically be coupled to error amplifier 50. In operation, high and low side switching elements 44, 46 are driven with a signal pwm_d# produced by an SR latch 52, with pwm_d# going low and turning on switching element 44 each time the latch gets set with a clock signal set_clk_d. Signals 'comp' and 'ramp' are compared with a PWM comparator 54, the output of which resets SR latch 52.

Figure 4:
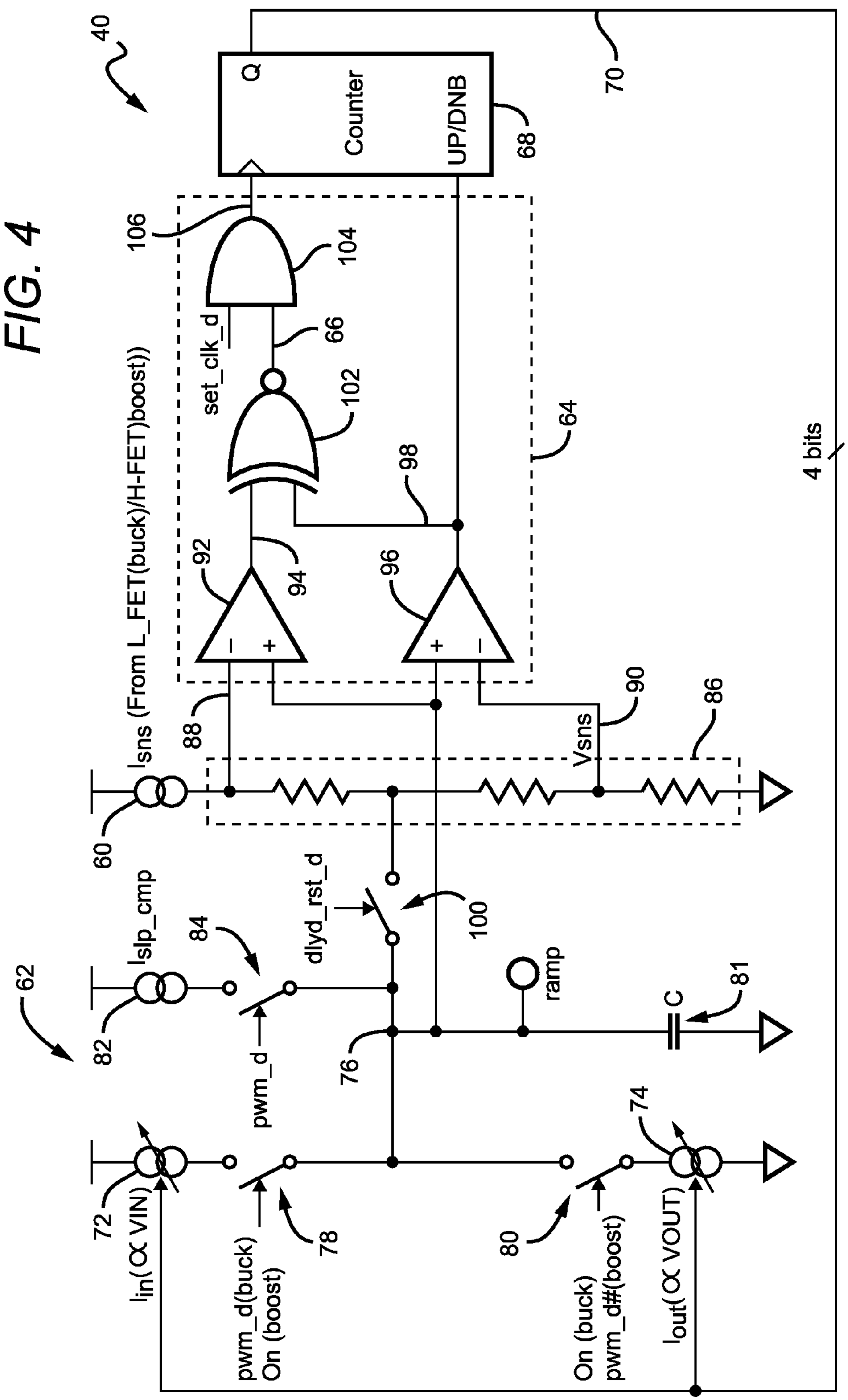
FIG. 4 is a schematic/block diagram of an inductor current emulation circuit per the present invention.

A block/schematic diagram of one possible embodiment of inductor current emulation circuit 40 is shown in FIG. 4. The circuit includes a current sensing circuit arranged to produce an output $I_{sns}$ which varies with the current in the switching element that is turned on during the converter's 'off' time (low side FET for a buck converter, high side FET for a boost converter); sensed current $I_{sns}$ is represented in FIG. 4 with a current source 60.

The emulation circuit also includes an emulated current generator circuit 62 arranged to produce the 'ramp' signal, which emulates the current in the converter's output inductor during both 'off' and 'on' times and which varies the 'ramp' signal in response to a control signal. A comparator circuit 64 is arranged to, during the 'off' time, compare the 'ramp' signal with at least one threshold voltage that varies with $I_{sns}$. and to toggle an output 66 when the 'ramp' signal exceeds the threshold voltage. A feedback circuit 68 provides the control signal 70 to emulated current generator circuit 62 and is arranged to vary the control signal each time said comparator circuit output toggles until the 'ramp' signal no longer exceeds the at least one threshold voltages. This arrangement serves to improve the accuracy of the 'ramp' signal during the 'on' time.

The simplified schematic of emulated current generator circuit 62 shown in FIG. 4 includes a first current source 72 arranged to output a positive (source) current which is preferably proportional to VIN and which varies with control signal 70, and a second current source 74 arranged to output a negative (sink) current which is preferably proportional to VOUT and which varies with control signal 70.

There is at least one switch connected between the output of at least one of current sources 72 and 74 and a node 76; two such switches 78, 80 are shown in FIG. 4. A capacitance 81 is also connected to node 76.

Emulation current generator circuit 62 is arranged such that:

when the converter is configured as a buck converter, the output of second current source 74 is connected to node 76 during both 'on' and 'off' times, and switch 78 connects the output of first current source 72 to node 76 during the 'on' time. When switch 78 is closed ('on' time), first current source 72 sources a current which is proportional to VIN and second current source 74 sinks a current proportional to VOUT. During 'off' time, switch 78 is open and a current proportional to VOUT is sunk by second current source 74.

when the converter is configured as a boost converter, the output of first current source 72 is connected to node 76 during both 'on' and 'off' times, and switch 80 connects the output of current source 74 to node 76 during the 'off' time. During 'on' time, switch 80 is open, and first current source 72 sources a current which is proportional to VIN. During 'off' time, switch 80 is closed, such that first current source 72 sources a current which is proportional to VIN and second current source 74 sinks a current proportional to VOUT.

The signal at node 76 is the said 'ramp' signal.

Figure 5:
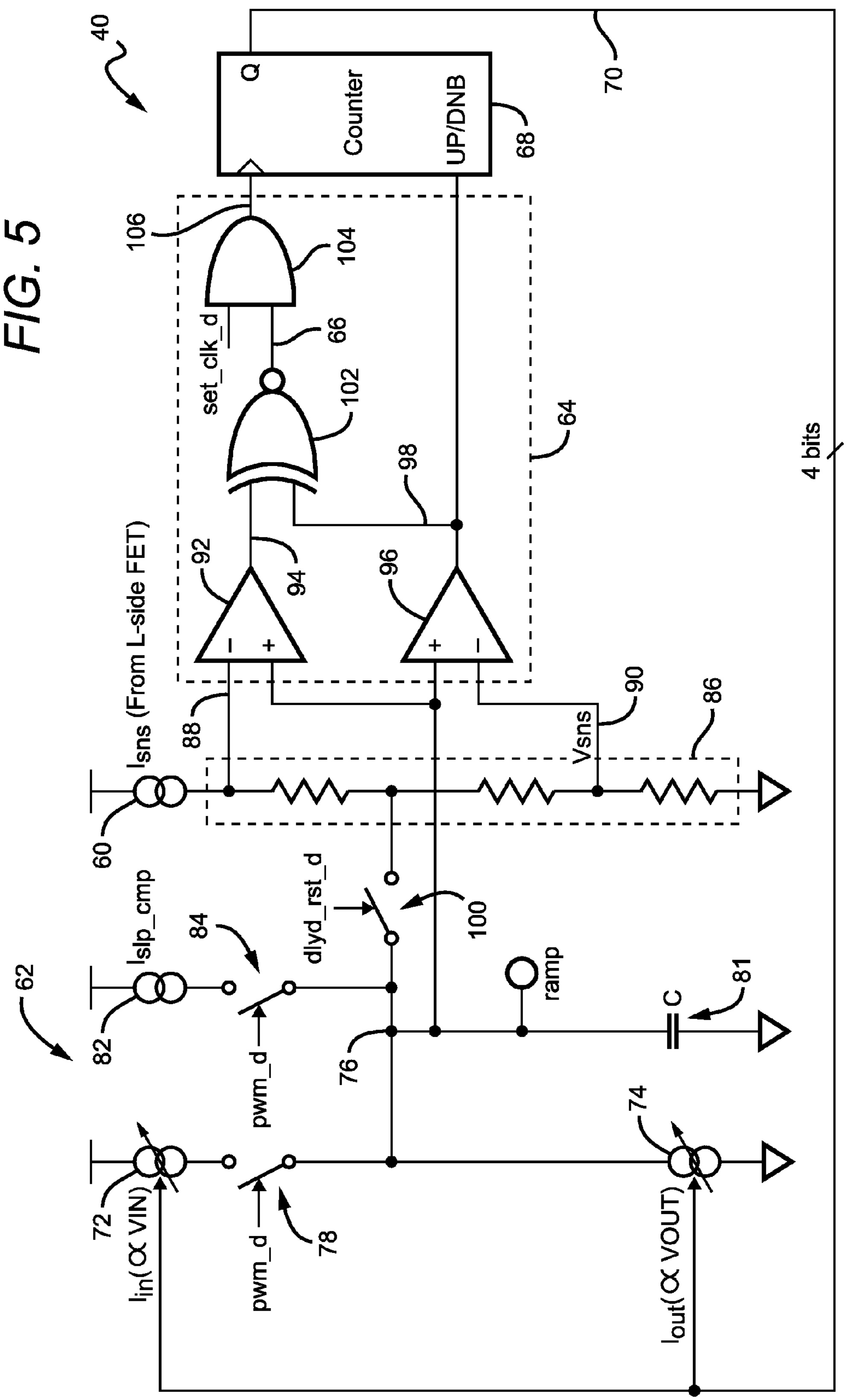
FIG. 5 is a schematic/block diagram of an inductor current emulation circuit per the present invention, as might be used with a buck converter.
Figure 6:
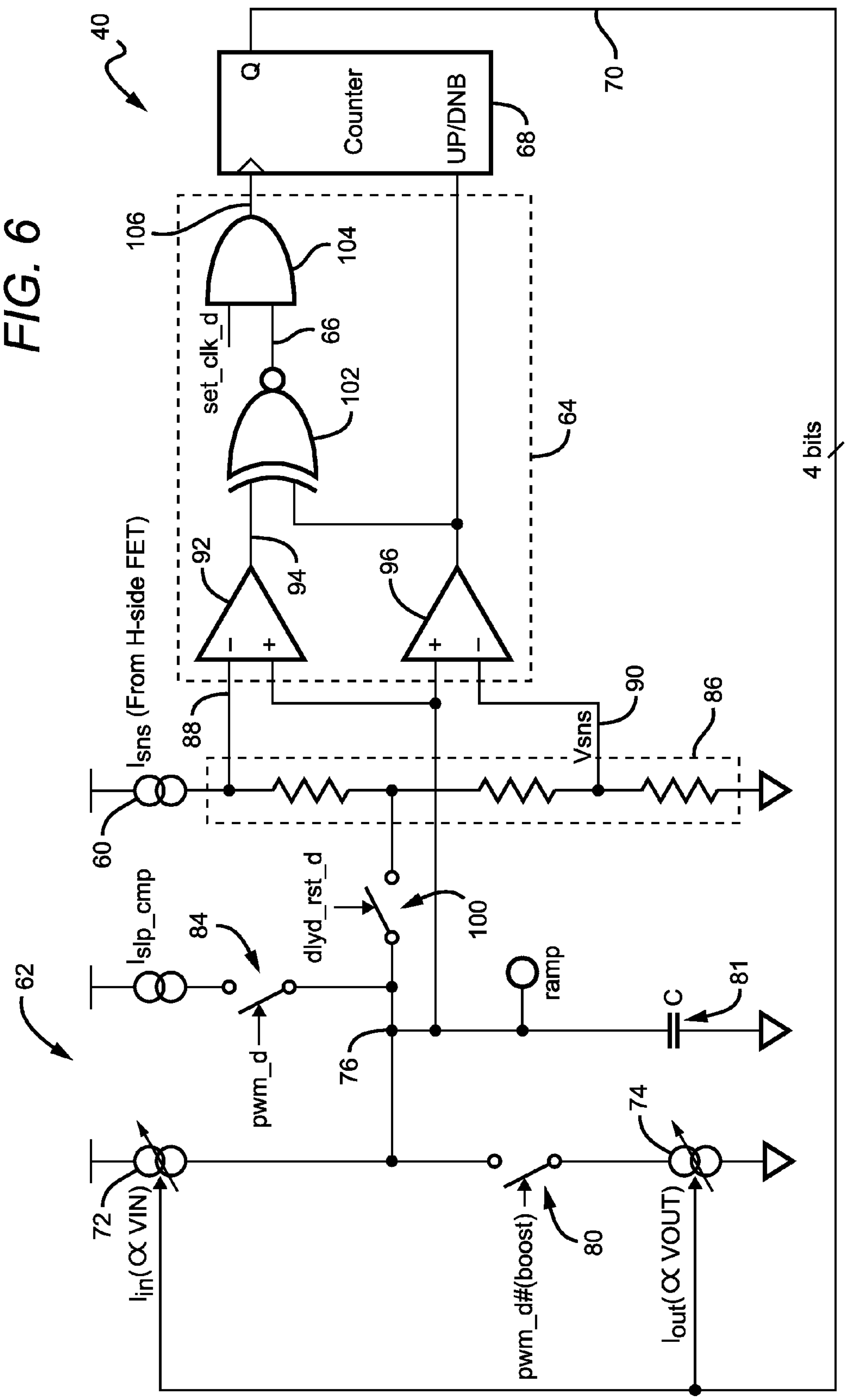
FIG. 6 is a schematic/block diagram of an inductor current emulation circuit per the present invention, as might be used with a boost converter.

If the switching converter is only to be used as a buck converter, only the output of first current source 72 needs to be switchably connected to node 76; second current source 74 can be hard-wired to node 76. This arrangement is shown in FIG. 5. Similarly, if the switching converter is only to be used as a boost converter, only the output of second current source 74 needs to be switchably connected to node 76; first current source 72 can be hard-wired to node 76. This arrangement is shown in FIG. 6.

Emulation current generator circuit 62 may also include a third current source 82 arranged to output a slope compensation current $I_{slp\_cmp}$, and a switch 84 connected between the output of the third current source and node 76, such that the third current source is connected to node 76 during the 'on' time.

One possible embodiment of comparator circuit 64 is shown in FIG. 4. In this example, circuit 64 includes a threshold voltage generating circuit 86 arranged to provide high (88) and low (90) threshold voltages which vary with the current sensing circuit output $I_{sns}$. Circuit 64 preferably includes 2 comparators: a first comparator 92 which receives the 'ramp' signal and high threshold voltage 88 at respective inputs and produces an output 94 which toggles when the 'ramp' signal increases above high threshold voltage 88, and a second comparator 96 which receives the 'ramp' signal and low threshold voltage 90 (Vsns) at respective inputs and produces an output 98 which toggles when the 'ramp' signal falls below low threshold voltage 90. A switch 100 is closed by a signal dlyd_rst_d to connect the 'ramp' signal to the comparators during a portion of the 'off' time—to low threshold voltage 90 in this example—such that the emulated slope voltage ('ramp') and the actual sensed current are compared when switch 100 is closed. The switching cycle includes a blanking time that occurs at the transition from 'on' time to 'off' time; signal dlyd_rst_d is preferably a one-shot signal arranged to close switch 100 at the end of the blanking time and opened prior to the end of said 'off time.

Logic circuitry, here an exclusive-NOR gate 102 and an AND gate 104, is connected to the outputs 94, 98 of comparators 92 and 96 and arranged to produce a clock pulse 106 when 'ramp' increases above high threshold voltage 88 or falls below low threshold voltage 90.

Emulated current generator circuit 62 is preferably arranged to vary the 'ramp' signal based on a digital word; this may be accomplished by, for example, implementing variable current sources 72 and 74 such that their output currents are varied based on a digital word applied at respective digital inputs. Feedback circuit 68 is preferably implemented with a counter which outputs the digital word (70), suitably but not necessarily 4 bits wide, with comparator circuit 64 and counter 68 arranged such that the counter output is varied each time the comparator circuit output toggles until the 'ramp' signal no longer exceeds the at least one threshold voltage.

Operation of the present inductor current emulation circuit is illustrated with the timing diagram shown in FIG. 7. When clock signal set_clk_d goes high, SR latch 52 is set, pwm_d goes high and pwm_d# goes low, turning on the high side switching element 44. The 'ramp' signal increases linearly during the 'on' time when high side switching element 44 is on.

When the 'off' time starts, low side switching element 46 turns on. Current sense circuit output $I_{sns}$ is proportional to the actual inductor current during the 'off' time, except during the blanking time period that is typically employed to prevent noise that occurs in $I_{sns}$ (and thus $V_{sns}$) just after the transition from 'on' to 'off' from degrading the accuracy of the emulation.

The emulated slope is made by the combination of capacitance 81 and variable current sources 72 and 74. During the 'off' time, the emulated slope is proportional to the output voltage (−VOUT in buck regulators and VIN−VOUT in boost regulators). When the 'off' time starts and the blanking time passes, one-shot signal dlyd_rst_d closes switch 100, and the emulated slope voltage is sampled by being shorted to Vsns. Then at the end of the 'off time, the emulated slope voltage and Vsns are compared by comparator circuit 64. If the emulated voltage is greater than the high threshold voltage 88 or less than low threshold voltage 90, a clock pulse (preferably aligned with set_clock_d) is generated at output 106 which causes the digital code 70 provided by counter 68 to change. This causes the outputs of current sources 72 and 74—and thus the emulated slope current—to change until the 'ramp' signal no longer exceeds the high or low threshold voltages, thereby improving the accuracy of the 'ramp' signal during the 'on' time.

During the 'on' time, the emulated slope is proportional to VIN−VOUT in buck regulators, or VIN in boost regulators. The emulated slope during the 'on' time is changed with the same ratio as that during the 'off' time, though note that slope compensation current $I_{slp\_cmp}$ is only added during the 'on' time, if needed to prevent sub-harmonic oscillation.

During the 'off' time, the emulated slope and the slope of the actual sensed current are compared. The characteristics of the output inductor and the internal capacitance and resistance will exhibit some variation, but these variations are independent of each other. As such, it is important to compare the emulated slope and the slope of the actual sensed current during the 'off' time. As a result, the emulated slope is appropriately steep in this architecture, and fast system response can be expected.

The present emulation circuit can also be arranged to accommodate a converter in which the inductor current goes to 0 before the end of the 'off' time, and stays at 0 until the next 'on' time; this is referred to as a '0-cross'. This can occur with, for example, light load conditions, for both buck and boost converters. Here, a 0-cross detection circuit (not shown) would be employed to detect when the inductor current falls to 0 before the end of the 'off' time. When a 0-cross is detected, the comparison timing is changed from the end of the 'off' time (as described above) to the time after the detection of a 0-cross (referred to as '0-cross time' in FIG. 9). During the 0-cross time, the emulated slope and the current sensing slope are shorted, with the sensing slope set to 0.

Figure 8:
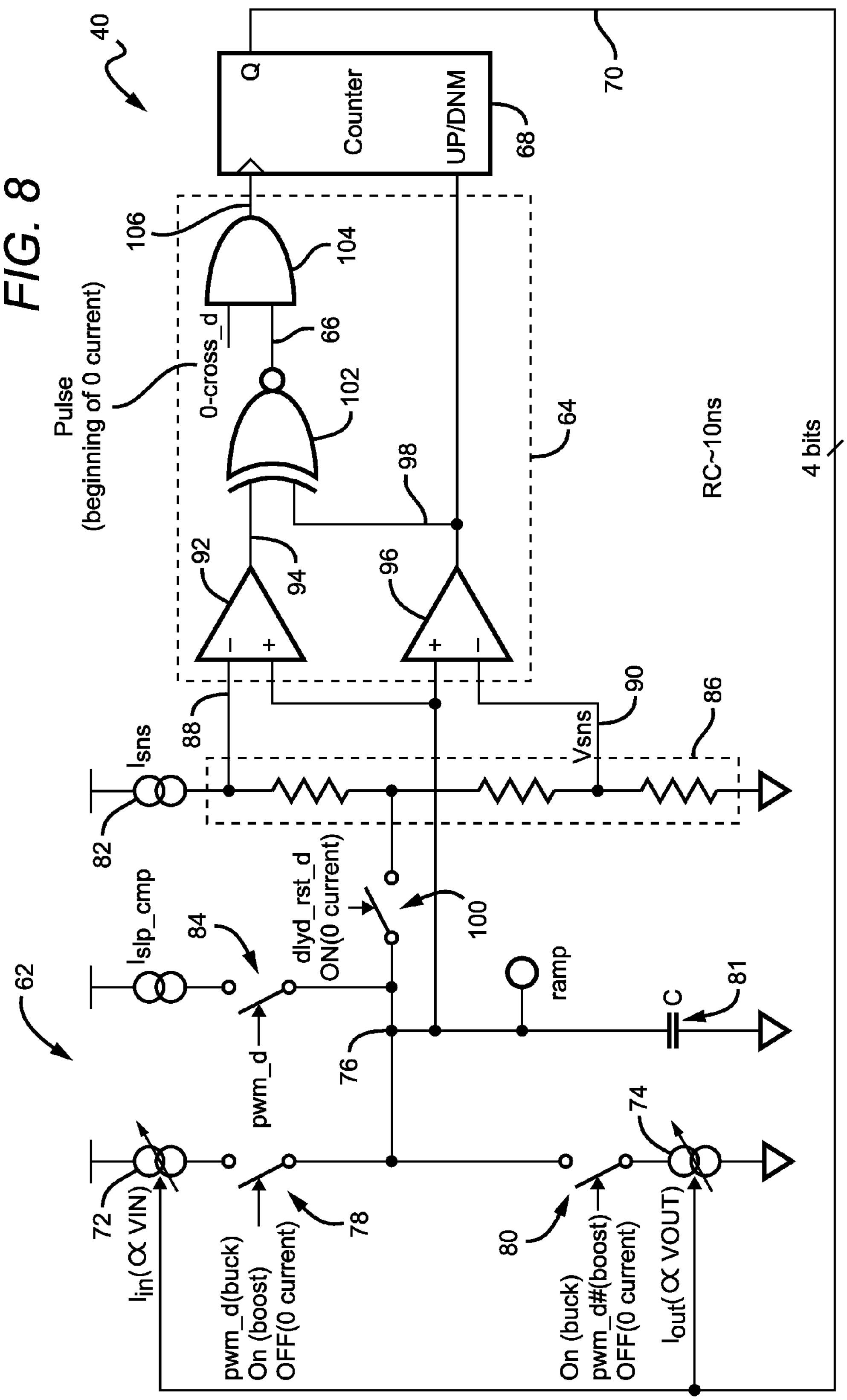
FIG. 8 is a schematic/block diagram of an inductor current emulation circuit per the present invention, as might be used with a 0-cross condition.

Operation of the present emulation for 0-cross events is shown in FIGS. 8 and 9. When a 0-cross event is detected, current source switches 78 and 80 are both off. Switch 100 is closed when the 0-cross event is detected, and the comparison is made immediately after the 0-cross event is detected, via a timing signal 0-cross_d provided to AND gate 104.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. An inductor current emulation circuit for use with a switching converter arranged to operate high and low side switching elements connected to an output inductor using a switching cycle having an associated 'on' time and 'off' time to produce an output voltage, in which regulation of said output voltage includes comparing an output which varies with the difference between said output voltage and a reference voltage with a 'ramp' signal which emulates the current in said converter's output inductor, said emulation circuit comprising:

- a current sensing circuit arranged to produce an output which varies with the current in the switching element that is turned on during said 'off' time, wherein said current sensing circuit senses the current in said low side switching element when said switching converter is configured as a buck converter, and senses the current in said high side switching element when said switching converter is configured as a boost converter;
- an emulated current generator circuit arranged to produce said 'ramp' signal such that it emulates the current in said converter's output inductor during said 'off' and 'on' times and which varies said 'ramp' signal in response to a control signal;
- a comparator circuit arranged to, during a portion of said 'off' time, compare said 'ramp' signal with at least one threshold voltage that varies with said current sensing circuit output, and to toggle an output when said 'ramp' signal exceeds said at least one threshold voltage; and
- a feedback circuit which provides said control signal to said emulated current generator and is arranged to vary said control signal each time said comparator circuit output toggles until said 'ramp' signal no longer exceeds said at least one threshold voltage.

2. The emulation circuit of claim 1, wherein said emulated current generator circuit comprises:

a first current source arranged to output a positive current which varies with said control signal;

a second current source arranged to output a negative current which varies with said control signal;

at least one switch connected between the output of at least one of said current sources and a first node; and a capacitance connected to said first node;

said emulation current generator circuit arranged such that:

when said converter is configured as a buck converter, said second current source is connected to said first node during both 'on' and 'off' times and said at least one switch connects the output of said first current source to said first node during said 'on' time; and when said converter is configured as a boost converter, said first current source is connected to said first node during both 'on' and 'off' times and said at least one switch connects the output of said second current source to said first node during said 'off' time, the signal at said first node being said 'ramp' signal.

3. The emulation circuit of claim 2, wherein said at least one switch comprises first and second switches, said first switch connected between the output of said first current source and said first node and said second switch connected between the output of said second current source and said first node.

4. The emulation circuit of claim 2, wherein said converter receives a supply voltage Vin and produces output voltage Vout, said first current source arranged to produce an output current which is proportional to Vin and which varies with said control signal, and said second current source arranged to produce an output current which is proportional to Vout and which varies with said control signal.

5. The emulation circuit of claim 2, further comprising:

a third current source arranged to output a slope compensation current; and a switch connected between the output of said third current source and said first node, said emulation current generator circuit arranged such that said third current source is connected to said first node during said 'on' time.

6. The emulation circuit of claim 2, wherein said comparator circuit comprises:

a threshold voltage generating circuit arranged to provide said high and low threshold voltages such that they vary with said current sensing circuit output;

a first comparator which receives said 'ramp' signal and said high threshold voltage at respective inputs and produces an output which toggles when said 'ramp' signal increases above said high threshold voltage;

a second comparator which receives said 'ramp' signal and said low threshold voltage at respective inputs and produces an output which toggles when said 'ramp' signal falls below said low threshold voltage;

a switch arranged to connect said 'ramp' signal to said comparators during a portion of said 'off' time; and logic circuitry connected to the outputs of said comparators and arranged to produce a clock pulse when said 'ramp' signal increases above said high threshold voltage or falls below said low threshold voltage.

7. The emulation circuit of claim 6, wherein said switching cycle includes a blanking time that occurs at the transition from 'on' time to 'off' time, said switch arranged to connect said 'ramp' signal to said comparators closed at the end of said blanking time and opened prior to the end of said 'off' time.

8. The emulation circuit of claim 6, further comprising a 0-cross detection circuit which detects when the current in said converter's output inductor falls to 0 before the end of the 'off' time.

9. The emulation circuit of claim 8, wherein said at least one switch comprises a first switch connected between the output of said first current source and a first node and a second switch connected between the output of said second current source and said first node;

said emulation current generator circuit further arranged such that:

when said 0-cross detection circuit detects when the current in said converter's output inductor falls to 0 before the end of the 'off' time, said first and second switches are opened such that said first and second current sources are disconnected from said first node;

said comparator circuit further arranged such that said switch arranged to connect said 'ramp' signal to said comparators during a portion of said 'off' time is closed when the 0-cross event is detected.

10. An inductor current emulation circuit for use with a switching converter arranged to operate high and low side switching elements connected to an output inductor using a switching cycle having an associated 'on' time and 'off' time to produce an output voltage, in which regulation of said output voltage includes comparing an output which varies with the difference between said output voltage and a reference voltage with a 'ramp' signal which emulates the current in said converter's output inductor, said emulation circuit comprising:

a current sensing circuit arranged to produce an output which varies with the current in the switching element that is turned on during said 'off' time;

an emulated current generator circuit arranged to produce said 'ramp' signal such that it emulates the current in said converter's output inductor during said 'off' and 'on' times and which varies said 'ramp' signal in response to a control signal, wherein said control signal is a digital word, said emulated current generator circuit arranged to vary said 'ramp' signal based on said digital word;

a comparator circuit arranged to, during a portion of said 'off' time, compare said 'ramp' signal with at least one threshold voltage that varies with said current sensing circuit output, and to toggle an output when said 'ramp' signal exceeds said at least one threshold voltage; and a feedback circuit which provides said control signal to said emulated current generator and is arranged to vary said control signal each time said comparator circuit output toggles until said 'ramp' signal no longer exceeds said at least one threshold voltage, wherein said feedback circuit comprises a counter which outputs said digital word.

11. The emulation circuit of claim 10, wherein said current sensing circuit senses the current in said low side switching element when said switching converter is configured as a buck converter, and senses the current in said high side switching element when said switching converter is configured as a boost converter.

12. The emulation circuit of claim 10, wherein said emulated current generator circuit comprises:

a first current source arranged to output a positive current which varies with said control signal;

a second current source arranged to output a negative current which varies with said control signal;

at least one switch connected between the output of at least one of said current sources and a first node; and a capacitance connected to said first node;

said emulation current generator circuit arranged such that:

when said converter is configured as a buck converter, said second current source is connected to said first node during both 'on' and 'off' times and said at least one switch connects the output of said first current source to said first node during said 'on' time; and when said converter is configured as a boost converter, said first current source is connected to said first node during both 'on' and 'off' times and said at least one switch connects the output of said second current source to said first node during said 'off' time, the signal at said first node being said 'ramp' signal.

13. The emulation circuit of claim 12, wherein said at least one switch comprises first and second switches, said first switch connected between the output of said first current source and said first node and said second switch connected between the output of said second current source and said first node.

14. The emulation circuit of claim 12, wherein said converter receives a supply voltage Vin and produces output voltage Vout, said first current source arranged to produce an output current which is proportional to Vin and which varies with said control signal, and said second current source arranged to produce an output current which is proportional to Vout and which varies with said control signal.

15. The emulation circuit of claim 12, further comprising:

a third current source arranged to output a slope compensation current; and a switch connected between the output of said third current source and said first node, said emulation current generator circuit arranged such that said third current source is connected to said first node during said 'on' time.

16. The emulation circuit of claim 10, wherein said switching cycle includes a blanking time that occurs at the transition from 'on' time to 'off' time, said comparator circuit arranged such that said 'ramp' signal is compared to said high and low threshold voltages for a period that begins at the end of said blanking time and ends prior to the end of said 'off' time.

17. The emulation circuit of claim 10, wherein an output of the emulated current generator circuit is electrically coupled to an input of a comparator of a pulse width modulation (PWM) circuit.

18. An inductor current emulation circuit for use with a switching converter which receives an input voltage Vin and is arranged to operate high and low side switching elements connected to an output inductor using a switching cycle having an associated 'on' time and 'off' time to produce an output voltage Vout, in which regulation of said output voltage includes comparing an output which varies with the difference between said output voltage and a reference voltage with a 'ramp' signal which emulates the current in said converter's output inductor, said emulation circuit comprising:

a current sensing circuit arranged to produce an output which varies with the current in the switching element that is turned on during said 'off' time;

an emulated current generator circuit arranged to produce said 'ramp' signal such that it emulates the current in said converter's output inductor during said 'off' and 'on' times, said emulated current generator circuit comprising:

a first current source arranged to output a positive current which is proportional to Vin and varies with a digital control signal;

a second current source arranged to output a negative current which is proportional to Vout and varies with said digital control signal;

at first switch connected between the output of said first current source and a first node;

a second switch connected between the output of said second current source and said first node;

a capacitance connected to said first node;

a third current source arranged to output a slope compensation current; and a third switch connected between the output of said third current source and said first node;

said emulation current generator circuit arranged such that:

when said converter is configured as a buck converter, said second current source is connected to said first node during both 'on' and 'off' times and said first switch connects the output of said first current source to said first node during said 'on' time;

when said converter is configured as a boost converter, said first current source is connected to said first node during both 'on' and 'off' times and said second switch connects the output of said second current source to said first node during said 'off' time, the signal at said first node being said 'ramp' signal; and said third current source is connected to said first node during said 'on' time;

a comparator circuit which, during a portion of said 'off' time, compares said 'ramp' signal with high and low threshold voltages which vary with said current sensing circuit output and toggles an output when said 'ramp' signal increases above said high threshold voltage or falls below said low threshold voltage; and a counter coupled to the output of said comparator circuit and which provides said digital control signal to said emulated current generating circuit and is arranged to vary said digital control signal each time said comparator circuit output toggles until said 'ramp' signal no longer exceeds said high or low threshold voltages.

19. The emulation circuit of claim 18, wherein said current sensing circuit senses the current in said low side switching element when said switching converter is configured as a buck converter, and senses the current in said high side switching element when said switching converter is configured as a boost converter.

20. The emulation circuit of claim 18, wherein said switching cycle includes a blanking time that occurs at the transition from 'on' time to 'off' time, said comparator circuit arranged such that said 'ramp' signal is compared to said high and low threshold voltages for a period that begins at the end of said blanking time and ends prior to the end of said 'off' time.

* * * * *

UNITED STATES PATENT AND TRADEMARK OFFICE

CERTIFICATE OF CORRECTION

PATENT NO. : 9,065,337 B2
APPLICATION NO. : 13/775820
DATED : June 23, 2015
INVENTOR(S) : Tanabe et al.

It is certified that error appears in the above-identified patent and that said Letters Patent is hereby corrected as shown below:

On the title page item [56], column 2, under "Other Publications", line 1, delete "10201402447.8," and insert --102014102447.8,--, therefor Signed and Sealed this
Sixteenth Day of February, 2016

Michelle K. Lee

Michelle K. Lee
*Director of the United States Patent and Trademark Office*